Nov. 11, 1958     L. E. ALEXANDER     2,859,685
MULTIPLE SKEWER
Filed July 20, 1956
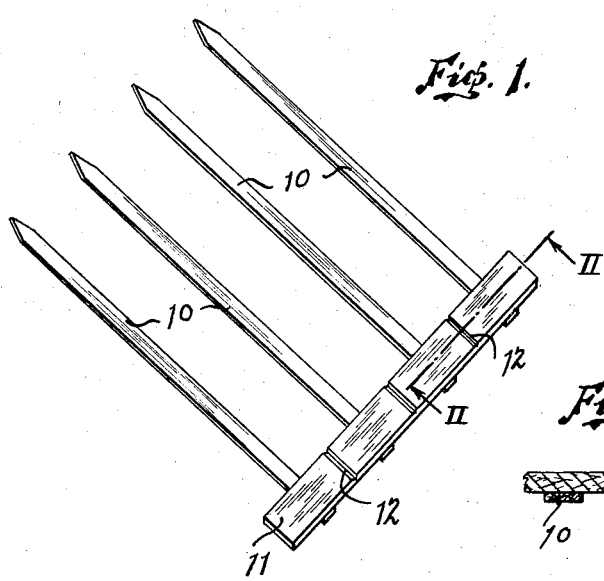
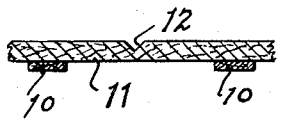
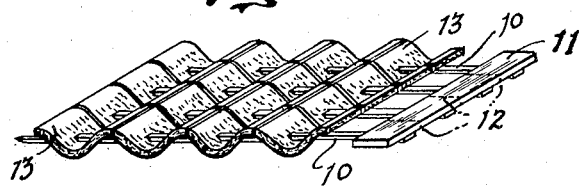
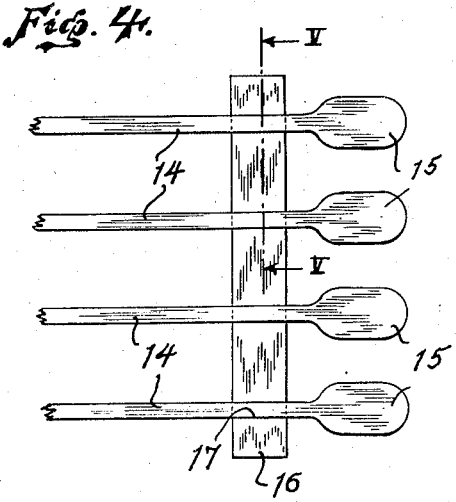
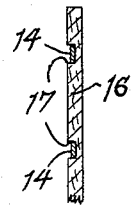
INVENTOR.
LEO E. ALEXANDER
BY
ATTORNEY

United States Patent Office 2,859,685
Patented Nov. 11, 1958

2,859,685

MULTIPLE SKEWER

Leo E. Alexander, Alamo, Calif.

Application July 20, 1956, Serial No. 599,250

1 Claim. (Cl. 99—419)

The present invention relates to the preparation of food and more particularly to an improved skewer for the grilling and serving food stuffs shish-ke-bab fashion.

An object of my invention is to provide a food grilling device having a plurality of skewers for supporting particles of food for grilling as a unit and a subsequent separation for consumption as individual servings.

Another object of the invention is to provide an improved means by which several servings of food may be prepared and sold as a unit for grilling and subsequently broken up for individual consumption from each of said skewers.

A further object of the invention is to provide a skewer for the mounting of food according to the method and for use with apparatus of the character disclosed in my co-pending application Serial Number 493,780, filed March 11, 1955 and entitled, "Method and Apparatus for Mounting Food."

Other objects and advantages will be in part evident to those skilled in the art and in part pointed out hereinafter in connection with the accompanying drawing, wherein there is shown by way of illustration and not of limitation a preferred embodiment of this invention.

In the drawing:

Figure 1, is a perspective view showing a preferred form of the invention,

Figure 2, is a fragmentary sectional view taken along line II—II of Figure 1,

Figure 3, is a perspective view showing the multiple skewer of Figure 1, as having particles of food arranged thereupon in the manner disclosed in my above co-pending application, Figure 4, is a fragmentary plan view showing a modified form of the invention, and Figure 5, is a fragmentary sectional view taken along line V—V of Figure 4.

At the present time in the preparation of food for serving on skewers as hors d'oeuvres and the like, it is generally the practice to secure the particles of food upon skewers that are then subjected to a grilling as individual servings. Consequently, in order to provide for several servings of the food upon these skewers, it is necessary that each of the skewers be handled and turned from time to time in order that the food thereupon be fully grilled. As distinguished from this practice, my present invention provides a device by which a plurality of skewers with food stuff thereupon may be subjected to grilling on both sides by the single and simple operation of turning the entire assembly of several skewers as a single unit after which the skewers may be separated from the assembly and individually served.

For a more detailed description of the invention, reference is now made to the accompanying drawing, wherein like numerals refer to similar parts through the several views.

In its preferred form, as shown in Figures 1, 2 and 3 of the drawing, my improved multiple skewer device comprises a plurality of skewers, designated by the numeral 10. These skewers 10 are of rectangular cross-section and are pointed at their outer ends. In this showing, the skewers 10 are also secured by any suitable means to one side of a header or supporting member 11, which under normal conditions serves to hold and maintain the several skewers 10 in spaced, parallel and co-planar relation so that food thereupon may be exposed to a grilling on each side by a simple turning over of the supporting member or header 11 as the grilling proceeds. A feature of the supporting member or header 11 is that it is provided with transversely extending weakened zones which provide breaking points that will permit of a separation between the several skewer supporting portions of the header 11 so that after grilling the food, while held upon each of the skewers 10, may be passed out as individual servings. While the skewers 10 and the skewer supporting header 11 may be of any suitable material, I have found that split bamboo is excellent as this material has been found to possess low heat retentivity and relatively high resistance to combustion when exposed to a heat as is encountered in grilling food thereupon.

As indicated in Figure 2 of the drawing, the weakened portions or breaking points in the header 11 are here provided for by a notch 12 extending into one side thereof, but if desired two of these notches 12 oppositely arranged may be provided. The skewers 10 may be glued to one side of the header or supporting member 11, but it will be understood that the attachment of the skewers 10 to the header 11 may be accomplished by other means.

In grilling particles of food with my improved multiple skewer, the particles of food, here designated by the numeral 13, are preferably cut or otherwise formed into thin rectangular or square strips so that when the individual skewers are threaded through a plurality of these particles of food in the manner shown, a substantially solid mass or sheet of the food will be exposed at one side to grilling when the skewer is in use. Then by a simple turning over the entire assembly thus formed, the food particles may be exposed as a unit to further grilling on the opposite side thereof.

When in use, each of the skewers 10 may carry a plurality of separated pieces of a similar food product or chunks of food such as meat, fish, shell fish and combinations of meat and onions or any other desired arrangement of food that is adapted for barbecuing or grilling in the manner proposed. With the food particles 13 pierced by the prongs 10 in the manner illustrated and with the above noted rectangular cross-section of the skewers 10, the food particles will have no tendency to turn or rotate about the skewers 10, but will instead remain fixed so that as the unit is turned, all of the particles of food will be subjected to a uniform grilling. Many of these foods may tend to shrink somewhat during the grilling and, therefore, by preparing the food and particularly meat in rather flat pieces arranged in close proximity as shown in Figure 3, the result will be a completely filled skewer following the grilling. Of course, more than one type of food may be mounted upon each of the skewers or upon alternate skewers of a single unit and in this way a myriad of tasty combinations is possible. Following the mounting of the pieces of meat or the like upon the skewers 10, additional flavoring or sauce may also be added prior to the grilling operation.

While I have described the merits of my improved multiple skewer in connection with the grilling of food stuffs, it will be understood that its field of usefulness may extend to the processing and distribution of certain food products. For example, it is conceivable that the unit with its plurality of skewers 10 may be provided with marinated, salted or otherwise preserved food products such as might be sold over the counter either at room temperature or by the now well established deep freeze method, by which frozen foods are commonly sold. When employed in this manner, the unit with the food products neatly arranged upon the several skewers can be made to present a very attractive article of food by enclosing same in a transparent wrapping through which the contents of the package may be seen.

In Figure 4 of the drawing, there is shown a modified form of the invention in which the skewers, here designated by the numeral 14, are shown as having an enlarged head 15 that forms a grip by which the individual skewers may be handled when separated from a header 16. As is more clearly illustrated in Figure 5 of the drawings, the skewers 14 are attached to the header 16 by being tightly fitted into notches 17 from which they can be readily removed after grilling.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claim are to be considered as part of this invention.

Having thus described my invention, what I claim and desire to secure by Letters Patent is:

A skewer assembly for simultaneously grilling and serving individually a plurality of food servings each of which are mounted shish-ke-bab fashion upon a skewer, comprising an elongated skewer supporting member having transverse notches forming weakened breaking points at spaced points therealong, a plurality of food supporting skewers secured to said supporting member between each of its breaking points and extending in spaced parallel relation in a common plane at one side thereof, said skewers being of rectangular cross-section to prevent turning of articles of food mounted thereupon, whereby the food servings carried by said plurality of skewers may be exposed as a unit to grilling on both sides by a turning of said skewer supporting member and eaten from said skewers as individual servings after grilling by breaking said skewer supporting member at its breaking points to separate the skewers.

References Cited in the file of this patent
UNITED STATES PATENTS

| | | |
|---|---|---|
| 410,675 | Raymond | Sept. 10, 1889 |
| 2,242,967 | Carlile | May 20, 1941 |
| 2,404,166 | Danilla | July 16, 1946 |
| 2,450,448 | Sawyer | Oct. 5, 1948 |
| 2,649,852 | McCandless | Aug. 25, 1953 |